(12) United States Patent
Hazenbroek

(10) Patent No.: US 8,727,839 B2
(45) Date of Patent: May 20, 2014

(54) POULTRY WING CUTTER FOR NARROW PITCH POULTRY LINES

(75) Inventor: David Scott Hazenbroek, Oud-Beijerland (NL)

(73) Assignee: Foodmate BV (NL)

( * ) Notice: Subject to any disclaimer, the term of this patent is extended or adjusted under 35 U.S.C. 154(b) by 681 days.

(21) Appl. No.: 13/011,068

(22) Filed: Jan. 21, 2011

(65) Prior Publication Data

US 2012/0190285 A1   Jul. 26, 2012

(51) Int. Cl.
*A22C 21/00* (2006.01)

(52) U.S. Cl.
USPC .............................................. 452/169

(58) Field of Classification Search
USPC ................... 452/149–155, 160, 169
See application file for complete search history.

(56) References Cited

U.S. PATENT DOCUMENTS

| | | |
|---|---|---|
| 3,956,794 A | 5/1976 | Verbakel |
| 3,969,790 A | 7/1976 | Smorenburg |
| 3,979,793 A | 9/1976 | Hazenbroek |
| 3,983,601 A | 10/1976 | Verbakel |
| 3,990,128 A | 11/1976 | van Mil |
| 4,034,440 A | 7/1977 | van Mil |
| 4,118,829 A | 10/1978 | Harben, Jr. |
| 4,131,973 A | 1/1979 | Verbakel |
| 4,147,012 A | 4/1979 | van Mil |
| 4,153,971 A | 5/1979 | Simonds |
| 4,153,972 A | 5/1979 | Harben et al. |
| 4,178,659 A | 12/1979 | Simonds |
| 4,203,178 A | 5/1980 | Hazenbroek |
| 4,283,813 A | 8/1981 | House |
| 4,292,709 A | 10/1981 | van Mil |
| 4,388,811 A | 6/1983 | Zebarth |
| 4,395,795 A | 8/1983 | Hazenbroek |
| 4,406,037 A | 9/1983 | Hazenbroek |
| 4,418,444 A | 12/1983 | Meyn et al. |
| 4,418,445 A | 12/1983 | Meyn et al. |
| 4,434,526 A | 3/1984 | van Mil |
| 4,439,891 A | 4/1984 | van Mil |
| 4,468,838 A | 9/1984 | Sjöström et al. |
| 4,510,886 A | 4/1985 | van Mil |
| 4,514,879 A | 5/1985 | Hazenbroek |
| 4,516,290 A | 5/1985 | van Mil |
| 4,524,489 A | 6/1985 | van Mil |
| 4,558,490 A | 12/1985 | Hazenbroek et al. |
| 4,559,672 A | 12/1985 | Hazenbroek et al. |
| 4,562,613 A * | 1/1986 | Lewis ........................ 452/160 |
| 4,567,624 A | 2/1986 | van Mil |
| 4,570,295 A | 2/1986 | van Mil |
| 4,574,429 A | 3/1986 | Hazenbroek |

(Continued)

FOREIGN PATENT DOCUMENTS

| | | |
|---|---|---|
| EP | 0 786 208 A1 | 7/1997 |
| EP | 2 181 841 A1 | 5/2010 |

*Primary Examiner* — Richard Price, Jr.
(74) *Attorney, Agent, or Firm* — Womble Carlyle Sandridge & Rice LLP

(57) ABSTRACT

A wing cutter for narrow pitch poultry processing lines includes a subframe supporting functional components of the wing cutter and a main frame to which the subframe is pivotally mounted. The subframe, and thus the functional components of the wing cutter, can be pivoted to a selected angle relative to the processing path depending at least in part on the pitch of the processing line. In one embodiment, the subframe and working components are rotated to an angle between about zero degrees and about fifteen degrees when the pitch of the processing line is about 8 inches.

19 Claims, 1 Drawing Sheet

(56) References Cited

U.S. PATENT DOCUMENTS

| | | |
|---|---|---|
| 4,577,368 A | 3/1986 | Hazenbroek |
| D283,289 S | 4/1986 | Hazenbroek |
| 4,593,432 A | 6/1986 | Hazenbroek |
| 4,597,133 A | 7/1986 | van de Nieuwelaar |
| 4,597,136 A * | 7/1986 | Hazenbroek .................. 452/169 |
| 4,635,317 A | 1/1987 | van der Eerden |
| 4,639,973 A | 2/1987 | van der Eerden |
| 4,639,974 A | 2/1987 | Olson |
| 4,639,975 A | 2/1987 | van der Eerden |
| 4,646,384 A | 3/1987 | van der Eerden |
| 4,651,383 A | 3/1987 | van der Eerden |
| 4,653,147 A | 3/1987 | van der Eerden |
| 4,682,386 A | 7/1987 | Hazenbroek et al. |
| 4,704,768 A | 11/1987 | Hutting et al. |
| 4,723,339 A | 2/1988 | van de Nieuwelaar et al. |
| 4,724,581 A | 2/1988 | van de Nieuwelaar |
| 4,736,492 A | 4/1988 | Hazenbroek |
| RE32,697 E | 6/1988 | Hazenbroek et al. |
| 4,765,028 A | 8/1988 | van de Nieuwelaar et al. |
| 4,766,644 A | 8/1988 | van den Nieuwelaar et al. |
| 4,769,872 A | 9/1988 | Hazenbroek et al. |
| 4,779,308 A | 10/1988 | van de Nieuwelaar et al. |
| 4,788,749 A | 12/1988 | Hazenbroek et al. |
| 4,811,456 A | 3/1989 | Heuvel |
| 4,811,458 A | 3/1989 | Nieuwelaar et al. |
| 4,811,462 A | 3/1989 | Meyn |
| 4,813,101 A | 3/1989 | Brakels et al. |
| 4,884,318 A | 12/1989 | Hazenbroek |
| 4,893,378 A | 1/1990 | Hazenbroek |
| 4,894,885 A | 1/1990 | Markert |
| 4,896,399 A | 1/1990 | Hazenbroek |
| 4,899,421 A | 2/1990 | Van Der Eerden |
| 4,918,787 A | 4/1990 | Hazenbroek |
| 4,928,351 A | 5/1990 | van den Nieuwelaar et al. |
| 4,935,990 A | 6/1990 | Linnenbank |
| 4,939,813 A | 7/1990 | Hazenbroek |
| 4,958,694 A | 9/1990 | van den Nieuwelaar et al. |
| 4,965,908 A | 10/1990 | Meyn |
| 4,972,549 A | 11/1990 | van den Nieuwelaar et al. |
| 4,993,113 A | 2/1991 | Hazenbroek |
| 4,993,115 A | 2/1991 | Hazenbroek |
| 5,001,812 A | 3/1991 | Hazenbroek |
| 5,013,431 A | 5/1991 | Doets |
| 5,015,213 A | 5/1991 | Hazenbroek |
| 5,019,013 A | 5/1991 | Hazenbroek |
| 5,026,983 A | 6/1991 | Meyn |
| 5,035,673 A | 7/1991 | Hazenbroek |
| 5,037,351 A | 8/1991 | van den Nieuwelaar et al. |
| 5,041,054 A | 8/1991 | van den Nieuwelaar et al. |
| 5,045,022 A | 9/1991 | Hazenbroek |
| 5,060,596 A | 10/1991 | Esbroeck |
| 5,064,402 A | 11/1991 | Koops |
| 5,067,927 A | 11/1991 | Hazenbroek et al. |
| 5,069,652 A | 12/1991 | Hazenbroek |
| 5,074,823 A | 12/1991 | Meyn |
| 5,088,959 A | 2/1992 | Heemskerk |
| 5,090,940 A | 2/1992 | Adkison |
| 5,098,333 A | 3/1992 | Cobb |
| 5,104,351 A | 4/1992 | van den Nieuwelaar et al. |
| 5,122,090 A | 6/1992 | van de Nieuwelaar et al. |
| 5,123,871 A | 6/1992 | van den Nieuwelaar et al. |
| 5,125,498 A | 6/1992 | Meyn |
| 5,147,240 A | 9/1992 | Hazenbroek et al. |
| 5,147,241 A | 9/1992 | Rudin |
| 5,154,664 A | 10/1992 | Hazenbroek et al. |
| 5,154,665 A | 10/1992 | Hazenbroek |
| RE34,149 E | 12/1992 | Markert |
| 5,173,076 A | 12/1992 | Hazenbroek |
| 5,173,077 A | 12/1992 | van den Nieuwelaar et al. |
| 5,176,563 A | 1/1993 | van den Nieuwelaar et al. |
| 5,176,564 A | 1/1993 | Hazenbroek |
| 5,178,890 A | 1/1993 | van den Nieuwelaar et al. |
| 5,186,679 A | 2/1993 | Meyn |
| 5,188,559 A | 2/1993 | Hazenbroek |
| 5,188,560 A | 2/1993 | Hazenbroek |
| 5,194,035 A | 3/1993 | Dillard |
| 5,197,917 A | 3/1993 | Verbakel et al. |
| 5,199,922 A | 4/1993 | Korenberg et al. |
| 5,222,905 A | 6/1993 | Van den Nieuwelaar et al. |
| 5,242,324 A | 9/1993 | Koops |
| 5,248,277 A | 9/1993 | Bos et al. |
| 5,256,101 A | 10/1993 | Koops |
| 5,269,721 A | 12/1993 | Meyn |
| 5,277,649 A | 1/1994 | Adkison |
| 5,277,650 A | 1/1994 | Meyn |
| 5,279,517 A | 1/1994 | Koops |
| 5,290,187 A | 3/1994 | Meyn |
| 5,299,975 A | 4/1994 | Meyn |
| 5,299,976 A | 4/1994 | Meyn |
| 5,318,428 A | 6/1994 | Meyn |
| 5,326,311 A | 7/1994 | Persoon et al. |
| 5,334,083 A | 8/1994 | van den Nieuwelaar et al. |
| 5,336,127 A | 8/1994 | Hazenbroek |
| 5,340,351 A | 8/1994 | Minderman et al. |
| 5,340,355 A | 8/1994 | Meyn |
| 5,342,237 A | 8/1994 | Kolkman |
| 5,344,359 A | 9/1994 | Kolkman |
| 5,344,360 A | 9/1994 | Hazenbroek |
| 5,366,406 A | 11/1994 | Hobbel et al. |
| 5,370,574 A | 12/1994 | Meyn |
| 5,372,246 A | 12/1994 | van Aalst |
| RE34,882 E | 3/1995 | Meyn |
| 5,429,549 A * | 7/1995 | Verrijp et al. .................. 452/169 |
| 5,439,702 A | 8/1995 | French |
| 5,453,045 A | 9/1995 | Hobbel et al. |
| 5,462,477 A | 10/1995 | Ketels |
| 5,470,194 A | 11/1995 | Zegers |
| 5,487,700 A | 1/1996 | Dillard |
| 5,505,657 A | 4/1996 | Janssen et al. |
| 5,549,521 A | 8/1996 | van den Nieuwelaar et al. |
| D373,883 S | 9/1996 | Dillard |
| 5,569,067 A | 10/1996 | Meyn |
| 5,595,066 A | 1/1997 | Zwanikken et al. |
| 5,605,503 A | 2/1997 | Martin |
| 5,643,072 A | 7/1997 | Lankhaar et al. |
| 5,643,074 A | 7/1997 | Linnenbank |
| 5,672,098 A | 9/1997 | Veraart |
| 5,676,594 A | 10/1997 | Joosten |
| 5,704,830 A | 1/1998 | Van Ochten |
| 5,713,786 A | 2/1998 | Kikstra |
| 5,713,787 A | 2/1998 | Schoenmakers et al. |
| 5,741,176 A | 4/1998 | Lapp et al. |
| 5,755,617 A | 5/1998 | van Harskamp et al. |
| 5,759,095 A | 6/1998 | De Weerd |
| 5,766,063 A | 6/1998 | Hazenbroek et al. |
| 5,782,685 A | 7/1998 | Hazenbroek et al. |
| 5,785,588 A | 7/1998 | Jacobs et al. |
| 5,803,802 A | 9/1998 | Jansen |
| 5,810,651 A | 9/1998 | De Heer et al. |
| 5,810,653 A | 9/1998 | Van Craaikamp et al. |
| 5,813,908 A | 9/1998 | Craaikamp |
| 5,827,116 A | 10/1998 | Al et al. |
| 5,833,527 A | 11/1998 | Hazenbroek et al. |
| 5,865,672 A | 2/1999 | Hazenbroek |
| 5,875,738 A | 3/1999 | Hazenbroek et al. |
| 5,947,811 A | 9/1999 | Hazenbroek et al. |
| 5,951,393 A | 9/1999 | Barendregt |
| 5,954,574 A * | 9/1999 | Verrijp et al. .................. 452/169 |
| 5,975,029 A | 11/1999 | Morimoto et al. |
| 5,976,004 A | 11/1999 | Hazenbroek |
| 5,980,377 A | 11/1999 | Zwanikken et al. |
| 6,007,416 A | 12/1999 | Janssen et al. |
| 6,007,417 A | 12/1999 | Jones et al. |
| 6,024,636 A | 2/2000 | Hazenbroek et al. |
| 6,027,403 A | 2/2000 | Hazenbroek et al. |
| 6,027,404 A | 2/2000 | Wols |
| 6,029,795 A | 2/2000 | Janssen et al. |
| 6,062,972 A | 5/2000 | Visser |
| 6,095,914 A | 8/2000 | Cornelissen et al. |
| 6,126,534 A | 10/2000 | Jacobs et al. |
| 6,132,304 A | 10/2000 | Aarts et al. |
| 6,142,863 A | 11/2000 | Janssen et al. |
| 6,152,816 A | 11/2000 | van den Nieuwelaar et al. |
| 6,176,772 B1 | 1/2001 | Hazenbroek et al. |

(56) References Cited

U.S. PATENT DOCUMENTS

| | | |
|---|---|---|
| 6,179,702 B1 | 1/2001 | Hazenbroek |
| 6,190,250 B1 | 2/2001 | Volk et al. |
| 6,193,595 B1 | 2/2001 | Volk et al. |
| 6,220,953 B1 | 4/2001 | Cornelissen et al. |
| 6,231,436 B1 | 5/2001 | Bakker |
| 6,254,471 B1 | 7/2001 | Meyn |
| 6,254,472 B1 | 7/2001 | Meyn |
| 6,277,021 B1 | 8/2001 | Meyn |
| 6,299,524 B1 | 10/2001 | Janssen et al. |
| 6,306,026 B1 | 10/2001 | Post |
| 6,322,438 B1 | 11/2001 | Barendregt |
| 6,358,136 B1 | 3/2002 | Volk et al. |
| 6,371,843 B1 | 4/2002 | Volk et al. |
| 6,375,560 B1 | 4/2002 | Verrijp |
| 6,383,069 B1 | 5/2002 | Volk et al. |
| 6,398,636 B1 | 6/2002 | Jansen et al. |
| 6,446,352 B2 | 9/2002 | Middelkoop et al. |
| 6,478,668 B2 | 11/2002 | Visser et al. |
| 6,599,179 B1 | 7/2003 | Hazenbroek et al. |
| 6,612,919 B2 | 9/2003 | Janset et al. |
| 6,656,032 B2 | 12/2003 | Hazenbroek et al. |
| 6,726,556 B2 | 4/2004 | Gooren et al. |
| 6,736,717 B1 | 5/2004 | Annema et al. |
| 6,764,393 B1 | 7/2004 | Hazenbroek et al. |
| 6,783,451 B2 | 8/2004 | Aandewiel et al. |
| 6,811,478 B2 | 11/2004 | van den Nieuwelaar et al. |
| 6,811,480 B2 | 11/2004 | Moriarty |
| 6,811,802 B2 | 11/2004 | van Esbroeck et al. |
| 6,830,508 B2 | 12/2004 | Hazenbroek et al. |
| 6,837,782 B2 | 1/2005 | Hetterscheid et al. |
| 6,899,613 B2 | 5/2005 | van den Nieuwelaar et al. |
| 6,912,434 B2 | 6/2005 | van den Nieuwelaar et al. |
| 6,986,707 B2 | 1/2006 | van den Nieuwelaar et al. |
| 7,018,283 B2 | 3/2006 | Schmidt et al. |
| 7,029,387 B2 | 4/2006 | van den Nieuwelaar et al. |
| 7,059,954 B2 | 6/2006 | Annema et al. |
| 7,063,611 B2 | 6/2006 | Nolten et al. |
| 7,066,806 B2 | 6/2006 | de Heer et al. |
| 7,070,493 B2 | 7/2006 | Hazenbroek et al. |
| 7,115,030 B2 | 10/2006 | van Hillo et al. |
| 7,125,330 B2 | 10/2006 | Beeksma et al. |
| 7,128,937 B2 | 10/2006 | van den Nieuwelaar et al. |
| 7,133,742 B2 | 11/2006 | Cruysen et al. |
| 7,172,781 B2 | 2/2007 | Kish |
| 7,232,365 B2 | 6/2007 | Annema et al. |
| 7,232,366 B2 | 6/2007 | van den Nieuwelaar et al. |
| 7,249,998 B2 | 7/2007 | van Esbroeck et al. |
| 7,261,629 B2 | 8/2007 | Holleman |
| 7,284,973 B2 | 10/2007 | van Esbroeck et al. |
| 7,302,885 B2 | 12/2007 | Townsend |
| 7,344,437 B2 | 3/2008 | Van den Nieuwelaar et al. |
| D565,941 S | 4/2008 | Peters et al. |
| 7,357,707 B2 | 4/2008 | de Vos et al. |
| 7,476,148 B2 | 1/2009 | McQuillan et al. |
| 7,494,406 B2 | 2/2009 | Van Esbroeck et al. |
| 7,530,888 B2 | 5/2009 | Annema et al. |
| 7,572,176 B2 | 8/2009 | Petersen et al. |
| 7,662,033 B1 | 2/2010 | Ritter et al. |
| 7,662,034 B2 | 2/2010 | Van Hillo et al. |
| 7,717,773 B2 | 5/2010 | Woodford et al. |
| 7,740,527 B1 | 6/2010 | Harben |
| 7,744,449 B2 | 6/2010 | van Esbroeck et al. |
| 7,824,251 B2 | 11/2010 | van den Nieuwelaar et al. |
| 8,430,728 B2 * | 4/2013 | Hazenbroek .................. 452/169 |
| 2001/0023171 A1 | 9/2001 | Hazenbroek et al. |
| 2002/0055328 A1 | 5/2002 | Schmidt et al. |
| 2002/0058470 A1 | 5/2002 | Schmidt et al. |
| 2002/0090905 A1 | 7/2002 | Moriarty |
| 2002/0168930 A1 | 11/2002 | Jansen et al. |
| 2003/0008606 A1 | 1/2003 | Hazenbroek et al. |
| 2003/0084856 A1 | 5/2003 | Hazenbroek et al. |
| 2003/0092372 A1 | 5/2003 | Aandewiel et al. |
| 2004/0198209 A1 | 10/2004 | Hazenbroek et al. |
| 2004/0235409 A1 | 11/2004 | Nolten et al. |
| 2005/0037704 A1 | 2/2005 | Heer et al. |
| 2005/0037705 A1 | 2/2005 | Beeksma et al. |
| 2005/0048894 A1 | 3/2005 | van Hillo et al. |
| 2005/0186897 A1 | 8/2005 | Holleman |
| 2005/0221748 A1 | 10/2005 | Hillo et al. |
| 2006/0099899 A1 | 5/2006 | Hazenbroek et al. |
| 2006/0217051 A1 | 9/2006 | Gerrits |
| 2007/0082595 A1 | 4/2007 | de Vos et al. |
| 2007/0221071 A1 | 9/2007 | Kuijpers et al. |
| 2007/0224306 A1 | 9/2007 | van Esbroeck et al. |
| 2008/0017050 A1 | 1/2008 | van Esbroeck et al. |
| 2008/0125025 A1 | 5/2008 | Van Den Nieuwelaar et al. |
| 2008/0171506 A1 | 7/2008 | Nieuwelaar et al. |
| 2009/0239457 A1 | 9/2009 | Jansen et al. |
| 2009/0320761 A1 | 12/2009 | Grave et al. |
| 2010/0022176 A1 | 1/2010 | Van De Nieuwelaar et al. |
| 2010/0029186 A1 | 2/2010 | Janssen et al. |
| 2010/0048114 A1 | 2/2010 | Van Den Nieuwelaar et al. |
| 2010/0062699 A1 | 3/2010 | Sorensen et al. |
| 2010/0075584 A1 | 3/2010 | Aandewiel et al. |
| 2010/0081366 A1 | 4/2010 | De Vos et al. |
| 2010/0120344 A1 | 5/2010 | Van Den Nieuwelaar et al. |
| 2010/0151779 A1 | 6/2010 | Bakker |
| 2010/0221991 A1 | 9/2010 | Hagendoorn |

* cited by examiner

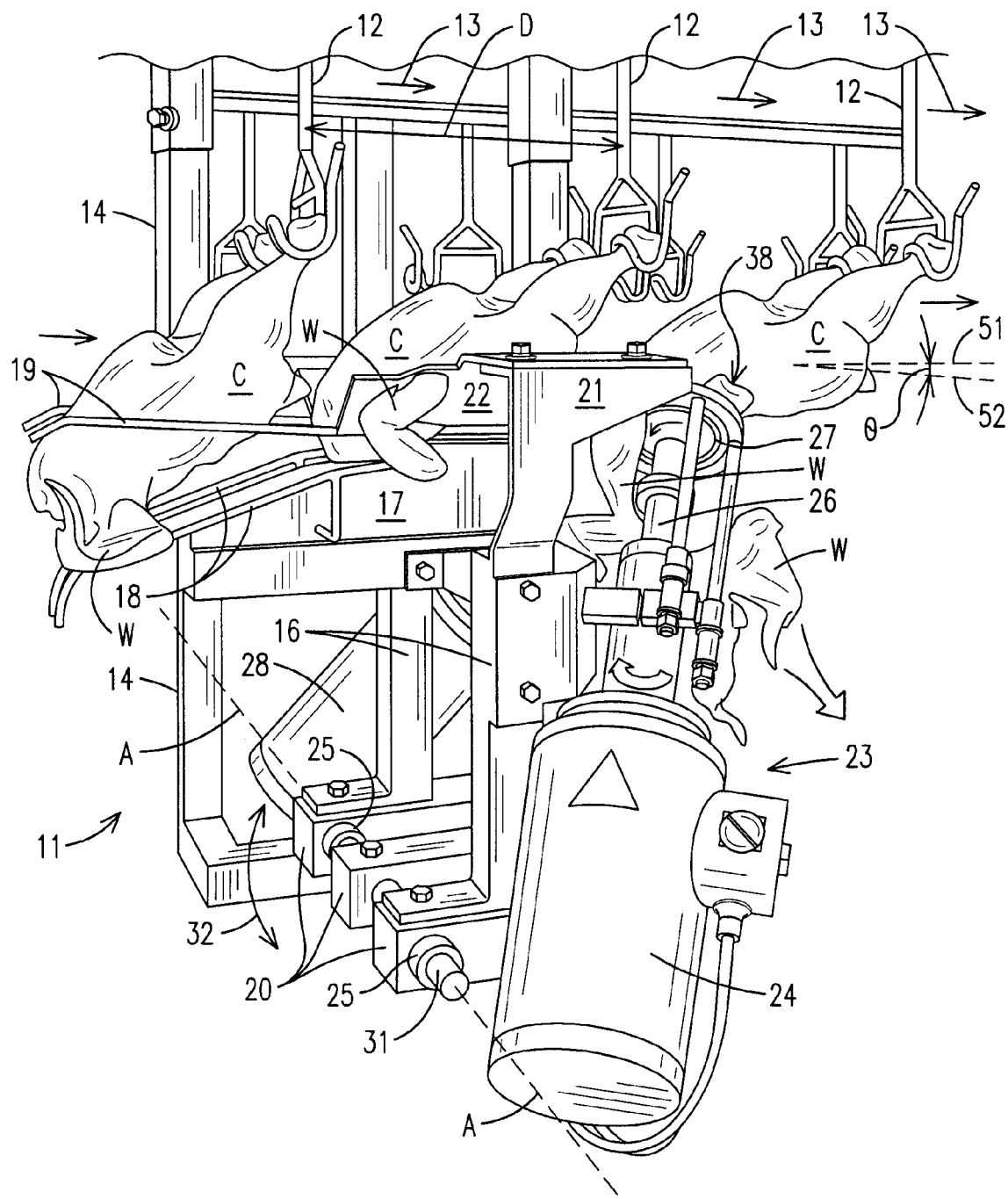

POULTRY WING CUTTER FOR NARROW PITCH POULTRY LINES

TECHNICAL FIELD

This disclosure relates generally to poultry processing methods and equipment and more particularly to wing cutters for removing wings from a poultry carcass as the carcass is conveyed along a processing path suspended from a set of shackles.

BACKGROUND

The processing of poultry such as chickens and turkeys has become highly automated. Birds generally are conveyed suspended by their legs from shackles conveyed by overhead conveying systems along processing lines for evisceration, cut-up, and further processing. It is highly desirable to perform as many of the processing operations on the birds as possible while the birds are suspended from their shackles to minimize handling and ensure greater uniformity in the cutting and processing of the birds. Accordingly, the birds are conveyed into engagement with various processing devices while they move in series suspended from their shackles along a processing path. For example, the birds can be defeathered, decapitated, opened, eviscerated, and cut apart while being advanced progressively through a poultry processing plant suspended from shackles of an overhead conveyor line. As a result, the labor required for processing poultry carcasses is significantly reduced while uniformity and adjustability in the sectioning of the poultry carcasses into various poultry parts is more predictable.

Chicken wings, commonly referred to as "buffalo wings" have become a popular takeout item for home consumption and as menu items in restaurants and fast food outlets. A demand has emerged for larger and meatier wings. This extra meat generally is taken from the breast and back portions of the birds. Care must be taken to insure that a precise desired quantity of meat is pulled from each breast as the wings are removed to meet the specifications of retailers and other purchasers of the wings. To ensure efficiency and proper cooking of the wings, it is important to retailers, restaurants, and others that all the wings being cooked are of substantially the same weight. Larger wings do not cook as fast as smaller wings, and thus there is a possibility that the larger wings of a batch with smaller wings will be undercooked or that the smaller wings in a batch with larger wings will be overcooked. The result is poor quality product that may have to be discarded. Accordingly, it is important that precise, equal amounts of breast meat be removed with the wings from the poultry carcass to ensure that each wing and its attached breast meat will be of a substantially equal size and weight.

To insure uniformity in the weight of chicken wings cut from birds in an automated processing plant, wing cutter machines have been developed. One example of a wing cutter is disclosed in U.S. Pat. No. 5,429,549 of Verrijp et al., and the contents of the patent are hereby incorporated by reference. In the wing cutter machine disclosed in this patent, as birds are carried sequentially through the wing cutter, the wings on one side of the birds are engaged by a first wing guide, which tends to spread the wings. This spreading of the wings dislocates the joints between the wings and shoulders of the birds and pulls a desired quantity of meat from the breasts. The birds are thereafter engaged by a first circular rotating blade, which separates the wings and the portions of breast meat from the birds. At the same time, the wings on the opposite sides of the birds are engaged by a second wing guide, which tends to spread the wings, dislocating the shoulder joints between the wings and shoulders of the bird and pulling a desired quantity of meat from the breasts. The dislocated shoulder joints are thereafter engaged by a second circular rotating blade, which separates the wings and pulled-away breast meat from the opposite sides of the bird carcasses. Thus, wings with part of the breast meat attached are cut from the moving birds to produce consistently sized and meatier chicken wings.

Other wing cutting devices are disclosed in, for example, U.S. Pat. No. 4,651,383 of van der Eerden and U.S. Pat. No. 5,569,069 of Horst et al., and the disclosures of these patents also are hereby incorporated by reference.

One way of increasing the production of a poultry processing line is to space the shackles of the overhead conveyor system closer together so that more birds per minute are conveyed past the various processing stations of the line. For example, if a standard spacing of the shackles is 12 inches, production can be increased by spacing the shackles a narrower 8 inches apart. This narrower configuration will be referred to herein as a "narrow pitch" poultry line, and the spacing in general between shackles and birds is referred to as the "pitch" of the line. While spacing the birds closer together does not interfere with equipment at some of the processing stations of the machine, it does at others. The wing cutter can be one of these stations. More particularly, as the birds traverse the wing cutter, their carcasses are pulled backward at an angle relative to vertical as the wings are spread, pulled out of the shoulder sockets, and cut away. If birds are too close together on the processing line (i.e. if the pitch is too narrow), then leading birds can impact immediately trailing birds as the leading birds are pulled backward in the wing cutter toward the trailing birds. This can cause the trailing birds to misfeed into the wing cutter, can interfere with the proper orientation of the birds and/or their wings, and can cause other problems that result in ineffective wing removal and reduced efficiency. The bird carcasses also may bang into each other as they leave the wing cutter and swing to and fro because they are being dropped from a severe angle at the downstream end of the wing cutter. Thus, the pitch of a poultry processing line may be limited by the narrowest pitch that can be accommodated efficiently by the wing cutter.

There is therefore a need for a wing cutter for an automated poultry processing line that can tolerate substantially narrower processing pitches (an 8 inch pitch as opposed to a 12 inch pitch for example) efficiently and effectively without leading birds interfering with trailing birds as the birds move through the wing cutter and with less chance of impact after the carcasses leave the wing cutter. It is to the provision of such a wing cutter and to a method of removing wings from poultry carcasses in a narrow pitch poultry processing operation that the present invention is primarily directed.

SUMMARY

Briefly described, a wing cutter for an automated poultry processing line includes a main frame that is fixed to the structure of the processing line and projects downwardly therefrom. A subframe is pivotally attached to the main frame. More specifically, a pivot shaft is secured to the main frame and projects horizontally therefrom in a direction transverse to the processing path along which birds are conveyed. The subframe includes mounting bars that are pivotally received on the pivot shaft, with the pivot shaft extending through bushings on the mounting bars. The various operational components such as guide rails, wing spreaders, and rotary knife assemblies are mounted to the subframe.

For processing birds at a traditional wider pitch such as 12 inches, the subframe can be pivoted on the pivot shaft so that the guide rails, wing spreaders, and processing path through the wing cutter are substantially horizontal and parallel to the processing path along which suspended birds are conveyed. However, for processing birds at a narrower pitch of, say, 8 inches, the subframe and operational components can be pivoted to an angle with respect to the processing path so that the downstream end of the wing cutter is lower than the upstream end of the cutter. The inventors have discovered that orienting the components of the wing cutter at an angle in this manner prevents birds, which are now closer together because of the narrow pitch, from engaging and interfering with each other as they move through the wing cutter. These and other aspects, features, and advantages of the apparatus and method will be appreciated better upon review of the detailed description set forth below taken in conjunction with the accompanying drawing FIGURE, which is briefly described as follows.

BRIEF DESCRIPTION OF THE DRAWING

FIG. 1 is a perspective view of a wing cutter that exhibits principles of the invention in one preferred embodiment.

DETAILED DESCRIPTION

Referring now in more detail to the drawing FIGURE, a wing cutter assembly 11 is positioned to engage birds, in this case chickens C that are suspended from shackles 12. The shackles 12 are secured to an overhead conveyor (not shown) and are moved along a processing path in the direction indicated by arrows 13. The shackles and thus the birds are spaced apart a distance D, referred to as the pitch of the processing line. The wing cutter assembly 11 includes a main frame 14 that may be secured to the processing line and extends downwardly therefrom. The main frame also may be vertically adjustable so that the vertical position of the wing cutter can be adjusted and locked as needed. A subframe 16 is pivotally coupled to the main frame for pivotal movement in the directions indicated by arrows 32. More specifically, a pivot shaft 31 is fixed to the main frame 14 and projects horizontally therefrom and in a direction substantially transverse to the direction of the processing path 13. The pivot shaft has an axis A. The subframe is formed with mounting boots 20 having aligned holes that are sized to be received onto the pivot shaft 31. Bushings 25 preferably are secured in the holes of the mounting boots to facilitate pivoting motion of the mounting boots, and thus the subframe, around the pivot shaft 31, as indicated at 32.

The operational components of the wing cutter are mounted to the subframe 16. More specifically, a support plate 17 is oriented vertically and is generally aligned with and located beneath the moving shackles and birds above. Lower guide rails 18 and upper guide rails 19 are secured to the support plate 17. The guide rails are configured and positioned to engage birds as they move along the processing path 13 and to align and position them properly as they move into the wing cutter as illustrated with the left-most bird in the FIGURE. Wing spreaders 21 are mounted to the subframe 16 and positioned downstream and outboard of the guide rails. While only one wing spreader is visible in FIG. 1, it will be understood that another mirror image wing spreader is positioned on the other side of the wing cutter. The two wing spreaders may, if desired, be positioned at different locations along the path of travel of the birds so that one wing spreader acts on one wing of the birds before the other wing spreader begins to act on the other wing. In any event, the wing spreaders 21 include a spreader plate that is configured and positioned to slide between the wings and the carcasses of birds as the birds move along the processing path and through the wing cutter. The spreader plates are oriented so that the wings are pulled or spread progressively away from the carcasses of the birds as the birds move along the length of the spreader plates. This action dislocates the shoulder joints of the birds and pulls some of the breast and/or back meat away from the carcasses.

A first knife assembly 23 is mounted to the subframe 16 on one side of the processing path and a second knife assembly 28 is mounted to the subframe 16 on the other side of the processing path. Knife assembly 23 will be described in more detail, and it will be understood that knife assembly 28 is similarly configured. Knife assembly 23 includes an electric motor 24 that rotates a drive shaft 26. A disc-shaped rotary blade or knife 27 is mounted to the end of the drive shaft 26 and is rotated thereby, preferably in the direction indicated by the arrow on the knife. The motor is positioned and oriented to locate the rotary knife 27 at the downstream end of the spreader plate 22 and to orient the knife to slice off the spread-out wing W and a piece of the breast meat from each bird as the birds are pulled by their shackles past the rotary knifes. Since the shoulder joints have been dislocated by the spreader plate 22, the knife need only slice through skin, tendons, and like between the separated ball and joint of the shoulder. The ball is thus left intact on the wing and the likelihood of producing bone fragments is greatly reduced. Since a small amount of the breast meat has been pulled outwardly from the bird during the wing spreading process, it too is sliced off (indicated at 38) and remains attached to the severed wing of the bird, which is commercially desirable.

As mentioned above, the subframe is pivotally mounted on pivot shaft 31 for pivotal movement 32 about the axis A of the pivot shaft. Since the functional components are mounted to the subframe, pivotal movement of the subframe causes the functional components to pivot in unison so that they can be oriented at an angle with respect to the processing path 13. For instance, if the phantom line 51 in FIG. 1 is parallel to the processing path 13, then the subframe and functional components can be pivoted until the path through the wing cutter 52 forms and angle $\theta$ with respect to the processing path 13. Once rotated to a desired or selected angle, the subframe and thus the functional components can be locked in place at that angle by a locking bolt (not visible in FIG. 1).

It has been discovered that pivoting the wing cutter to a forward angle ($\theta$ for example) with respect to the processing path 13; i.e. pivoting the downstream end of the cutter downwardly respect to the upstream end, eliminates interference between adjacent birds moving through the wing cutter at a narrow pitch of say 8 inches. This was a surprising and unexpected result; however, and without wishing to be bound by theory, it is believed that orienting the wing cutter at such an angle increases or makes less severe the angle at which birds are pulled back as they traverse the wing cutter. As a result, leading birds are not pulled back to a point that they engage and interfere with immediately trailing birds.

The wing cutter may be oriented at any angle within a range of angles, and the most effective angle may be different for different pitches of the processing line and different size birds. For example, an angle of 0 degrees (0°) may be an effective angle for a processing line running at a standard 12 inch or wider pitch wherein shackles and birds are spaced 12 inches or more apart. The most effective angle for a processing line running at a narrower 8 inch pitch, however, may be between about one degree (1°) and fifteen degrees (15°), and more specifically about 1°, about 2°, about 3°, about 4°, about 5°, about 6°, about 7°, about 8°, about 9°, about 10°, about 11°, about 12°, about 13°, about 14°, or about 15° depending upon the sizes of birds being processed and other factors. Pitches in-between 12 and 8 inches have corresponding effective angles of the wing cutter relative to the processing path 13. Further, for processing lines running at less than an 8 inch pitch, even greater angles may be effective; however, pitches narrower than 8 inches are not common because the birds are close enough together at such pitches to cause problems at other locations along the processing line. Applicant has discovered that an effective angle of the wing cutter relative to the processing path for an 8 inch pitch processing line and average sized birds may be approximately 10 degrees (10°). It will thus be seen that the angle may be established or selected, depending on the pitch and other factors, within a range of from about 0 degrees (0°) to about fifteen degrees (15°) and may be about ten degrees (10°) for an 8 inch pitch processing line with average size birds.

The invention has been described herein within the context of preferred embodiments and methodologies considered by the inventors to represent the best modes of carrying out the invention. It will be clear to those of skill in the art, however, that a wide variety of additions, deletions, and modifications might well be made to the illustrated embodiments within the scope of the invention. For example, while pivoting motion of the wing cutter in the illustrated embodiment is facilitated by mounting a subframe to a pivot shaft, any other suitable technique and configuration of elements that allow the wing cutter to be oriented at a desired angle relative to the processing path may be substituted, and all should be construed to be substantially the same way to obtain substantially the same result. Further, while one particular style of wing cutter with a particular configuration and arrangement of functioning components is illustrated, there certainly are other and different wing cutter configurations and arrangements. The particular style of wing cutter shown in FIG. 1 is thus not a limitation of the invention and the methodology disclosed herein wherein a wing cutter is angled relative to the processing path to accommodate a narrow pitch line may be applied to many styles of wing cutters. The disclosure may also be applied to processing lines for birds other than chickens such as, for instance, turkeys, hens, and the like. These and other modifications may be made to the illustrated embodiments without departing from the spirit and scope of the invention as set forth in the claims.

What is claimed is:

1. A wing cutter for an automated poultry processing line whereon birds are spaced at a predetermined pitch and moved along a processing path, the wing cutter comprising:
    a frame;
    a plurality of functional components mounted to the frame and arranged to be engaged by suspended birds moving along the processing line to sever the wings from the birds;
    the functional components including a wing spreader for spreading the wings of the birds away from the bodies of the birds and a knife for cutting the spread wings away from the body;
    a mounting assembly coupled with the frame, the mounting assembly configured to facilitate selective orientation of the frame and the functional components mounted to the frame at a selected angle within a range of angles with respect to the processing path.

2. A wing cutter as claimed in claim 1 and wherein the mounting assembly facilitates pivotal movement of the frame and functional components about a pivot axis to permit selective orientation of the frame and functional components.

3. A wing cutter as claimed in claim 2 and wherein the mounting assembly comprises a pivot shaft.

4. A wing cutter as claimed in claim 3 and wherein the frame is a subframe and further comprising a main frame, the pivot shaft facilitating pivoting movement of the subframe relative to the main frame.

5. A wing cutter as claimed in claim 4 and wherein the pivot shaft is fixed to the main frame and the subframe is pivotally mounted on the pivot shaft.

6. A wing cutter as claimed in claim 4 and further comprising a locking mechanism for locking the subframe at a pivot angle relative to the processing path.

7. A wing cutter as claimed in claim 3 and wherein the mounting assembly comprises at least one opening formed in the frame for rotatably receiving the pivot shaft.

8. A wing cutter as claimed in claim 7 and wherein the mounting assembly comprises bushings disposed between the hole and the pivot shaft.

9. A wing cutter as claimed in claim 1 and wherein the selected angle is determined based at least partially on the predetermined pitch.

10. A wing cutter as claimed in claim 9 and wherein the selected angle is between about zero degrees and about fifteen degrees.

11. A wing cutter as claimed in claim 10 and wherein the predetermined pitch is between about 12 inches and about 8 inches.

12. A wing cutter as claimed in claim 11 and wherein the predetermined pitch is about 12 inches and the selected angle is about 0 degrees.

13. A wing cutter as claimed in claim 11 and wherein the predetermined pitch is about 8 inches and the selected angle is between one degree and fifteen degrees inclusive.

14. A wing cutter as claimed in claim 13 and wherein the selected angle is about ten degrees.

15. A method of adapting a poultry processing machine located along an automated processing line whereon poultry moves along a processing path to function with different pitches of the processing line, the method comprising the steps of:
    (a) selecting an angle based at least in part on the pitch of the processing line; and
    (b) orienting the poultry processing machine to the selected angle relative to the processing path.

16. The method of claim 15 and wherein the processing machine is a wing cutter.

17. The method of claim 16 and where in step (a), the pitch of the processing line is about 12 inches and selecting an angle comprises selecting an angle of about 0 degrees.

18. The method of claim 16 and where in step (a), the pitch of the processing line is about 8 inches and selecting an angle comprises selecting an angle between about zero degrees and about fifteen degrees.

19. The method of claim 18 and wherein selecting an angle between about 0 degrees and about fifteen degrees comprises selecting an angle of about ten degrees.

* * * * *